United States Patent
He et al.

(10) Patent No.: US 11,381,673 B2
(45) Date of Patent: Jul. 5, 2022

(54) PROFILE PICTURE DISPLAY METHOD BASED ON IMS CALL, STORAGE DEVICE, AND MOBILE TERMINAL

(71) Applicant: HUIZHOU TCL MOBILE COMMUNICATION CO., LTD., Huizhou (CN)

(72) Inventors: Jiancai He, Huizhou (CN); Tao Li, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 0 days.

(21) Appl. No.: 16/632,376

(22) PCT Filed: Jul. 13, 2018

(86) PCT No.: PCT/CN2018/095605
§ 371 (c)(1),
(2) Date: Jan. 20, 2020

(87) PCT Pub. No.: WO2019/019930
PCT Pub. Date: Jan. 31, 2019

(65) Prior Publication Data
US 2020/0228639 A1   Jul. 16, 2020

(30) Foreign Application Priority Data
Jul. 28, 2017   (CN) .......................... 201710628522.X

(51) Int. Cl.
H04M 1/57   (2006.01)
G06F 16/955   (2019.01)
(Continued)

(52) U.S. Cl.
CPC .......... *H04M 1/576* (2013.01); *G06F 16/955* (2019.01); *H04L 9/0643* (2013.01); *H04L 65/1016* (2013.01); *H04L 65/1089* (2013.01)

(58) Field of Classification Search
CPC combination set(s) only.
See application file for complete search history.

(56) References Cited

U.S. PATENT DOCUMENTS

| | | | |
|---|---|---|---|
| 2010/0077048 A1* | 3/2010 | Czyzewicz | ............. H04L 67/02 709/206 |
| 2011/0125765 A1* | 5/2011 | Tuli | .................... G06F 16/4387 707/751 |
| 2015/0294377 A1* | 10/2015 | Chow | ..................... G06F 21/57 705/347 |

(Continued)

FOREIGN PATENT DOCUMENTS

| CN | 101795260 A | 8/2010 |
|---|---|---|
| CN | 102158816 A | 8/2011 |

(Continued)

OTHER PUBLICATIONS

International Search Report and Written Opinion for related International Application No. PCT/CN2018/095605 dated Sep. 27, 2018;(3 pages).
Chinese First office action, Chinese Application No. 201710628522.X, dated May 25, 2020 (16 pages).
Notification to Grant Patent Right for invention,Chinese Application No. 201710628522.X, dated Dec. 18, 2020 (3 pages).

*Primary Examiner* — Junpeng Chen

(57) ABSTRACT

Disclosed in the present invention are a profile picture display method based on IMS call, a storage device, and a mobile terminal. In the method in the present invention, when an IMS call connection is established between mobile terminals, the two mobile terminals exchange profile picture information of users of the mobile terminals, and match the latest profile picture of the opposite user with a local address (Continued)

book; when finding that the profile picture of the opposite user is vacant or needs to be updated, the mobile terminal obtains the latest profile picture of the opposite user, updates the latest profile picture to the local address book for storage, and displays the latest profile picture of the opposite user on its call interface.

15 Claims, 1 Drawing Sheet

(51) Int. Cl.
*H04L 9/06* (2006.01)
*H04L 65/1016* (2022.01)
*H04L 65/1089* (2022.01)

(56) References Cited

U.S. PATENT DOCUMENTS

2016/0366242 A1* 12/2016 Oh .......................... H04L 67/06
2019/0045335 A1*  2/2019 Jin ....................... H04W 80/10

FOREIGN PATENT DOCUMENTS

| | | |
|---|---|---|
| CN | 103118355 A | 5/2013 |
| CN | 103209247 A | 7/2013 |
| CN | 104348885 A | 2/2015 |
| CN | 104954538 A | 9/2015 |
| CN | 106657254 A | 5/2017 |
| TW | 201101754 A | 1/2011 |
| WO | WO2014111022 A1 | 7/2014 |

* cited by examiner

PROFILE PICTURE DISPLAY METHOD BASED ON IMS CALL, STORAGE DEVICE, AND MOBILE TERMINAL

TECHNICAL FIELD

The present disclosure relates to the technical field of mobile terminals, and in particular, to a profile picture display method based on IMS calls, a storage device, and a mobile terminal.

BACKGROUND

With quick popularization of mobile terminals, mobile terminals have already become necessary production, entertainment and communication tools in people's daily life. Mobile terminals bring lots of conveniences for people's life.

IMS (IP Multimedia Subsystem) is a new multimedia business form, it can meet requirements for more novel and more diversified multimedia services of current customers of mobile terminals. At present, IMS is considered as a core technology of the next generation of network, and is also an important method for solving differentiated businesses, such as integration of mobile terminals and fixed networks, introduction of triple integration of voice, data, and video, etc. With more and more use occasions of mobile terminals, people's social circles are wider and wider, address books of mobile terminals store much important contact information.

However, in the prior art, profile picture information of contacts in an address book of a mobile terminal is generally vacant. This results in that a user is sometimes hard to remember who a caller is according to only remark names of contacts, and brings inconvenience into use of users. Although profile picture information of some contacts exist, once they update their profile pictures, or a certain contact sets profile picture information, a mobile terminal cannot acquire their latest profile pictures, this also brings inconveniences into the use of users.

Therefore, the prior art still needs to be improved and developed.

SUMMARY

A technical problem to be solved by the present disclosure is that: aiming at the above defects of the prior art, a profile picture display method based on IMS calls, a storage device, and a mobile terminal are provided; they are intended to solve the problems in the prior art that profile picture information of contacts in an address book of a mobile terminal is generally vacant, and existing profile picture information of contacts cannot be updated automatically.

In order to solve the above technical problems, the present disclosure provides a storage device, which stores a plurality of instructions; wherein the instructions are suitable for being loaded and executed by a processor to implement a profile picture display method based on IMS calls, which comprises the following steps: step A, by a first mobile terminal, sending an IMS call connection request to a second mobile terminal, and by the first mobile terminal and the second mobile terminal, respectively sending a first updating message and a second updating message containing the latest profile picture information of a respective user to each other; wherein, before the processor executes the instructions to implement the step A, the method further comprises: step S, setting a file server configured to store the latest profile picture information of a user of the first mobile terminal and of a user of the second mobile terminal in advance; by the first mobile terminal and the second mobile terminal, regularly uploading the latest profile picture information of a respective user to the file server; step B, by the first mobile terminal and the second mobile terminal, respectively obtaining an MD5 value and URL positioning information of the latest profile picture of the opposite user from the second updating message and the first updating message; wherein, by the processor, executing the instructions to implement the step B specifically comprises: step B1, by the first mobile terminal, obtaining and resolving the second updating message; step B2, by the first mobile terminal, resolving the latest profile picture information of a user of the second mobile terminal from the second updating message, and obtaining an MD5 value and URL positioning information of a profile picture therefrom; step B3, by the second mobile terminal, obtaining and resolving the first updating message; step B4, by the second mobile terminal, resolving the latest profile picture information of a user of the first mobile terminal from the first updating message, and obtaining an MD5 value and URL positioning information of a profile picture therefrom; step C, by the first mobile terminal and the second mobile terminal, respectively reading profile picture information of a contact in a respective local address book, when profile picture information of an opposite user in a local address book is vacant, downloading the latest profile picture of the user of a corresponding mobile terminal from the preset file server according to the obtained URL positioning information, and storing the profile picture to the local address book; step D, when profile picture information of a user of the opposite mobile terminal exists in the local address book, comparing an MD5 value of an obtained latest profile picture with an MD5 value of a corresponding profile picture in the local address book; when the MD5 values are different, downloading the latest profile picture of the user of a corresponding mobile terminal from the preset file server according to the obtained URL positioning information, and updating the profile picture to the local address book; step E, by the second mobile terminal, receiving the IMS call request, and by the first mobile and the second mobile terminal, respectively displaying the latest profile picture of an opposite user on a respective call interface.

In order to solve the above technical problems, a technical solution adopted by the present disclosure is to provide a profile picture display method based on IMS calls, wherein the method comprises: step A, by a first mobile terminal, sending an IMS call connection request to a second mobile terminal, and by the first mobile terminal and the second mobile terminal, respectively sending a first updating message and a second updating message containing the latest profile picture information of a respective user to each other; step B, by the first mobile terminal and the second mobile terminal, respectively obtaining an MD5 value and URL positioning information of the latest profile picture of the opposite user from the second updating message and the first updating message; step C, by the first mobile terminal and the second mobile terminal, respectively reading profile picture information of a contact in a respective local address book, when profile picture information of an opposite user in a local address book is vacant, downloading the latest profile picture of the user of a corresponding mobile terminal from a preset file server according to the obtained URL positioning information, and storing the profile picture to the local address book; step D, when profile picture information of a user of the opposite mobile terminal exists in the local address book, comparing an MD5 value of an obtained latest profile picture with an MD5 value of a corresponding profile picture in the local address book; when the MD5 values are different, downloading the latest profile picture of the user of a corresponding mobile terminal from the preset file server according to the obtained URL positioning information, and updating the profile picture to the local address book; step E, by the second mobile terminal, receiving the IMS call request, and by the first mobile and the second mobile terminal, respectively displaying the latest profile picture of an opposite user on a respective call interface.

In order to solve the above technical problems, the present disclosure further provides a mobile terminal, comprising: a processor, and a storage device in communication connection with the processor; wherein, the storage device is suitable for storing a plurality of instructions; the processor is suitable for calling the instructions in the storage device to execute a method for implementing profile picture display based on IMS calls, which comprises: step A, by a first mobile terminal, sending an IMS call connection request to a second mobile terminal, and by the first mobile terminal and the second mobile terminal, respectively sending a first updating message and a second updating message containing the latest profile picture information of a respective user to each other, step B, by the first mobile terminal and the second mobile terminal, respectively obtaining an MD5 value and URL positioning information of the latest profile picture of the opposite user from the second updating message and the first updating message; step C, by the first mobile terminal and the second mobile terminal, respectively reading profile picture information of a contact in a respective local address book, when profile picture information of an opposite user in a local address book is vacant, downloading the latest profile picture of the user of a corresponding mobile terminal from a preset file server according to the obtained URL positioning information, and storing the profile picture to the local address book; step D, when profile picture information of a user of the opposite mobile terminal exists in the local address book, comparing an MD5 value of an obtained latest profile picture with an MD5 value of a corresponding profile picture in the local address book; when the MD5 values are different, downloading the latest profile picture of the user of a corresponding mobile terminal from the preset file server according to the obtained URL positioning information, and updating the profile picture to the local address book; step E, by the second mobile terminal, receiving the IMS call request, and by the first mobile and the second mobile terminal, respectively displaying the latest profile picture of an opposite user on a respective call interface; wherein the method further comprises: taking a mobile terminal actively calling and sending an IMS call connection request as the first mobile terminal; taking a mobile terminal being called and receiving an IMS call connection request as the second mobile terminal.

Compared with the prior art, beneficial effect of the technical solutions provided by the present disclosure is that: differing from the situation of the prior art, in the present disclosure, when an IMS call connection is established between mobile terminals, the two mobile terminals exchange profile picture information of a respective user, and match the latest profile picture of the opposite user with a local address book; when finding that the profile picture of the opposite user is vacant or needs to be updated, the mobile terminal obtains the latest profile picture of the opposite user, updates the latest profile picture to a local address book for storage, and displays the latest profile picture of the opposite user on a respective call interface. Not only are the address books of the mobile terminals enriched, but also users are enabled to know who the person calling at this time is more intuitively by displaying the profile picture information of the opposite party during the IMS calling process, such that convenience is brought into the use of users.

DETAILED DESCRIPTION

In order to make purposes, technical solutions, and effects of the present disclosure be clearer and more explicit, the present disclosure is further described in detail below with reference to drawings and embodiments. It should be understood that the specific embodiments described here are only intended to illustrate the present disclosure, but not to limit the present disclosure.

Figure 1:
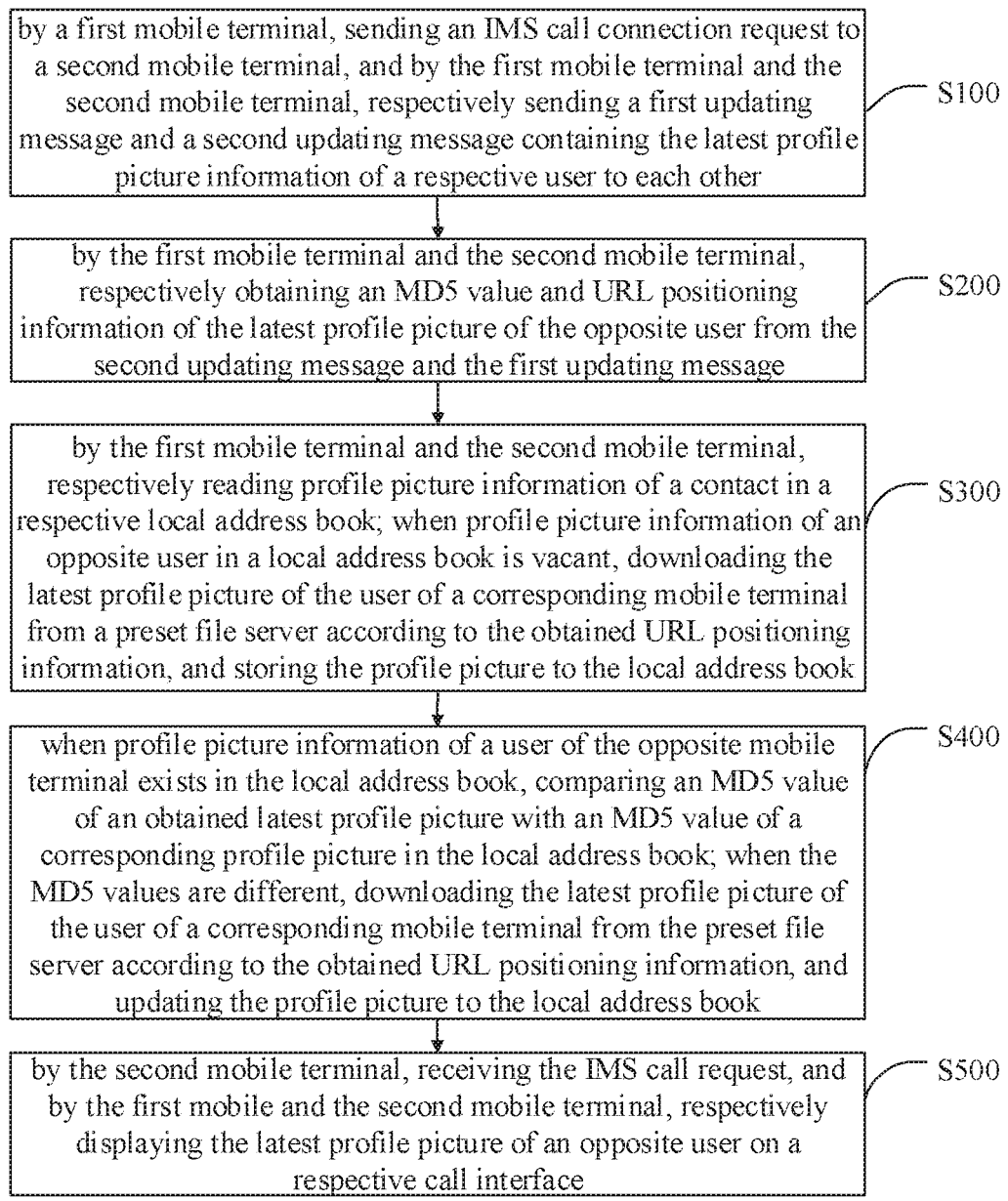
FIG. 1 is a flow chart of a preferred embodiment of a profile picture display method based on IMS calls of the present disclosure.

As shown in FIG. 1, FIG. 1 is a flow chart of a preferred embodiment of a profile picture display method based on IMS calls of the present disclosure. The profile picture display method based on IMS calls comprises the following steps.

Step S100, by a first mobile terminal, sending an IMS call connection request to a second mobile terminal; and by the first mobile terminal and the second mobile terminal, respectively sending a first updating message and a second updating message containing the latest profile picture information of a respective user to each other.

Preferably, the step S100 specifically comprises:

Step S101, by the first mobile terminal, calling the second mobile terminal and sending an IMS request to the second terminal;

Step S102, by the first mobile terminal, sending profile picture information newly uploaded to a file server in the form of a first updating message to the second mobile terminal; wherein the first updating message includes profile picture information of a user of the first mobile terminal;

Step S103, by the second mobile terminal, receiving the first updating message sent from the first mobile terminal;

Step S104, by the second mobile terminal, sending profile picture information newly uploaded to a file server in the form of a second updating message to the first mobile terminal; wherein the second updating message includes profile picture information of a user of the second mobile terminal.

In a specific implementation, a file server is set in advance to store the latest profile picture information of a user of the first mobile terminal and of a user of the second mobile terminal. The first mobile terminal and the second mobile terminal can regularly upload latest profile picture information of a respective user to the file server. Preferably, after uploading is completed, MD5 (Message Digest Algorithm-5, which is a hash function widely used in the field of computer security configured to provide integrity protection for messages) values of profile picture information are calculated; once the profile picture information changes, even a byte changes, the calculated MD5 values will have big differences, therefore, the present disclosure uses an MD5 value to determine whether a profile picture of a user is updated. More preferably, after a mobile terminal finishes uploading, a MD5 value and URL (Uniform Resource Locator) positioning information of the latest profile picture of a user are stored into local storage space of the mobile terminal, wherein the URL positioning information is used to quickly search and accurately download a profile picture from the file server.

Further, when a user uses the first mobile terminal to call the second mobile terminal, an IMS call connection request is sent to the second mobile terminal. For example: a user A uses the first mobile terminal to dial the number of the second mobile terminal of a user B. The first mobile terminal of the user A obtains newly uploaded profile picture information of the user A from the file server, and sends a first updating message containing latest profile picture information of the user A to the second mobile terminal of the user B. At the same time, when the second mobile terminal of the user B receives the first updating message, similarly, it obtains newly uploaded profile picture of the user B from the file server, and sends a second updating message containing latest profile picture information of the user B to the first mobile terminal of the user A. In this way, when two mobile terminals establish an IMS call connection, both the two mobile terminals send updating messages containing profile picture information of a respective user to each other, so as to obtain profile picture information of a user of an opposite mobile terminal.

Step S200, by the first mobile terminal and the second mobile terminal, respectively obtaining an MD5 value and URL positioning information of the latest profile picture of an opposite user from the second updating message and the first updating message.

Preferably, the step S200 specifically comprises:

Step S201, by the first mobile terminal, obtaining and resolving the second updating message;

Step S202, by the first mobile terminal, resolving the latest profile picture information of a user of the second mobile terminal from the second updating message, and obtaining an MD5 value and URL positioning information of a profile picture therefrom;

Step 203, by the second mobile terminal, obtaining and resolving the first updating message;

Step S204, by the second mobile terminal, resolving the latest profile picture information of a user of the first mobile terminal from the first updating message, and obtaining an MD5 value and URL positioning information of a profile picture therefrom.

In a specific implementation, when a mobile terminal receives an updating message sent from an opposite mobile terminal, it resolves the updating message and obtains profile picture information therein. For example, the first mobile terminal of the user A resolves and obtains the latest profile picture information of the user B in the second updating message, and further obtains an MD5 value and URL positioning information of a profile picture of the user B therein. At the same time, the second mobile terminal of the user B resolves and obtains the latest profile picture information of the user A in the first updating message, and further obtains an MD5 value and URL positioning information of a profile picture of the user A therein. Therefore, both the first mobile terminal and the second mobile terminal obtain the latest profile picture information of a user of an opposite mobile terminal, and further obtain the MD5 value and URL positioning information of the profile picture.

Step S300, by the first mobile terminal and the second mobile terminal, respectively reading profile picture information of a contact in a respective local address book; when profile picture information of an opposite user in a local address book is vacant, downloading a latest profile picture of a user of a corresponding mobile terminal from a preset file server according to the obtained URL positioning information, and storing the profile picture to the local address book.

Preferably, the step S300 specifically comprises:

Step S301, by the first mobile terminal and the second mobile terminal, respectively obtaining a respective local address book, and reading profile picture information of all contacts;

Step S302, when profile picture information of an opposite user in a local address book is vacant, indicating that profile picture information of the user of the corresponding mobile terminal is not stored;

Step S303, according to obtained URL positioning information of the profile picture of the user of the corresponding mobile terminal, downloading the latest profile picture of the user of the corresponding mobile terminal from the preset file server;

Step S304, updating the downloaded latest profile picture of the user of the corresponding mobile terminal to the local address book to store.

In specific implementation, after the first mobile terminal and the second mobile terminal obtain the latest profile picture information of a user of an opposite mobile terminal, they read profile picture information of a contact in a respective local address book; when finding that the profile picture information of the other party in a local address book is vacant, it is indicated that the profile picture of the user of the corresponding mobile terminal is not stored; thus, according to obtained URL positioning information of the profile picture of the user of the corresponding mobile terminal, the latest profile picture of the user of the corresponding mobile terminal is downloaded from the preset file server and stored into the address book. For example, when the first mobile terminal of the user A, after reading its local address book, finds that the profile picture information of a contact B (the user B) is vacant, it quickly searches the latest profile picture of the contact B from the file server according to previously obtained URL positioning information of the latest profile picture information of the contact B, and downloads the profile picture and stores it into the address book. In this way, the profile picture information of the contact B in the first mobile terminal of the user A is filled. In a similar way, when the second mobile terminal of the user B, after reading its local address book, finds that the profile picture information of a contact A (the user A) is vacant, it quickly searches the latest profile picture of the contact A from the file server according to previously obtained URL positioning information of the latest profile picture information of the contact A, and downloads the profile picture and stores it into the address book. In this way, the profile picture information of the contact A in the second mobile terminal of the user B is filled. Accordingly, it can be seen that the present disclosure can automatically obtain the latest profile picture of a contact of which profile pictures are not previously stored in a local address book, and thus provide convenience to users.

Step S400, when profile picture information of a user of an opposite mobile terminal exists in a local address book, comparing an MD5 value of an obtained latest profile picture with an MD5 value of a corresponding profile picture in the local address book; when the MD5 values are different, downloading the latest profile picture of the user of the corresponding mobile terminal from the preset file server according to the obtained URL positioning information, and updating the profile picture to the local address book.

Preferably, the step S400 specifically comprises:

Step S401, when profile picture information of a user of an opposite mobile terminal exists in a local address book, comparing an MD5 value of an obtained latest profile picture with an MD5 value of a corresponding profile picture in the local address book, and determining whether they are the same;

Step S402, when the MD5 values are different, downloading the latest profile picture of the user of the corresponding mobile terminal from the preset file server according to the obtained URL positioning information of a profile picture of the user of the corresponding mobile terminal;

Step S403, replacing an original profile picture in the local address book with the downloaded latest profile picture of the user of the corresponding mobile terminal, and storing.

In specific implementation, when profile picture information of a user of an opposite mobile terminal exists in a local address book, an MD5 value of an obtained latest profile picture is compared with an MD5 value of a corresponding profile picture in the local address book to determine whether they are the same, so as to determine whether the profile picture of the user of the mobile terminal is updated. For example, when a profile picture of the contact B exists in a local address book of a mobile terminal of the user A, an MD5 value of a latest profile picture of the contact B obtained from the file server is compared with an MD5 value of a profile picture of the contact B previously stored in the address book; when the two MD5 values are different, it is indicated that profile picture information of the contact B is updated; thus, a latest profile picture of the contact B is downloaded from the preset file server according to previously obtained URL positioning information of the latest profile picture of the contact B, and the previous profile picture of the contact B in the address book is replaced, so that the profile picture of the contact B is updated. In a similar way, when a profile picture of the contact A exists in a local address book of a mobile terminal of the user B, the above method is also suitable. Accordingly, it can be seen that the present disclosure can automatically the obtained latest profile picture of a contact and update it to a local address book when the profile picture of the contact changes, and thus provide convenience to users.

Step S500, by the second mobile terminal, receiving the IMS call request, and by the first mobile and the second mobile terminal, respectively displaying the latest profile picture of an opposite user on a respective call interface.

Preferably, the step S500 specifically comprises:

Step S501, by the second mobile terminal, according to operation instruction of a user, receiving an IMS call request sent from the first mobile terminal;

Step S502, by the first mobile terminal, displaying an obtained latest profile picture of the user of the second mobile terminal on its call interface;

Step S503, by the second mobile terminal, displaying an obtained latest profile picture of the user of the first mobile terminal on its call interface.

In specific implementation, since both the first mobile terminal and the second mobile terminal obtain the latest profile picture of an opposite user, when the second mobile terminal receives the IMS call connection request sent from the first mobile terminal, the first mobile terminal and the second mobile terminal respectively display the latest profile picture of an opposite user on a respective call interface. For example, the user B receives an IMS call connection request of the user A, and thus the first mobile terminal of the user A displays the latest profile picture of the user B on the call interface of the first mobile terminal of the user A; similarly, the second mobile terminal of the user B displays the latest profile picture of the user A on the call interface of the second mobile terminal of the user B. The users of both the two parties can see the profile pictures of opposite users on the call interfaces of the mobile terminals, so that convenience and interest are brought into use of the users.

Figure 2:
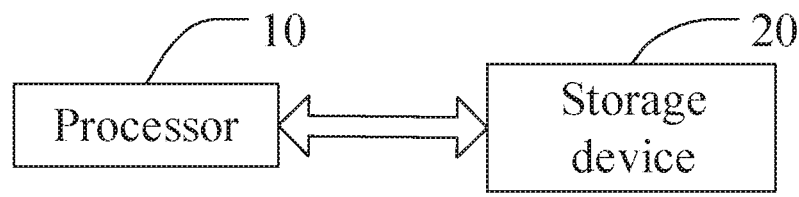
FIG. 2 is a functional and principal block diagram of a preferred embodiment of a mobile terminal of the present disclosure.

Based on the above embodiments, the present disclosure further discloses a mobile terminal, which is the first mobile terminal (e.g., the mobile terminal of the user A) when actively calling and sending an IMS call connection request, and is the second mobile terminal (e.g., the mobile terminal of the user B) when being called and receiving the IMS call connection request. As shown in FIG. 2, it comprises a processor 10, and a storage device 20 connected with the processor; wherein, the processor 10 is configured to call program instruction in the storage device 20 to execute a method provided by the above embodiment, for example, the following steps are executed.

Step S100, by a first mobile terminal, sending an IMS call connection request to a second mobile terminal; and by the first mobile terminal and the second mobile terminal, respectively sending a first updating message and a second updating message containing the latest profile picture information of a respective user to each other.

Step S200, by the first mobile terminal and the second mobile terminal, respectively obtaining an MD5 value and URL positioning information of the latest profile picture of an opposite user from the second updating message and the first updating message.

Step S300, by the first mobile terminal and the second mobile terminal, respectively reading profile picture information of a contact in a respective local address book; when profile picture information of an opposite user in a local address book is vacant, downloading a latest profile picture of a user of a corresponding mobile terminal from a preset file server according to the obtained URL positioning information, and storing the profile picture to the local address book.

Step S400, when profile picture information of a user of an opposite mobile terminal exists in a local address book, comparing an MD5 value of an obtained latest profile picture with an MD5 value of a corresponding profile picture in the local address book; when the MD5 values are different, downloading the latest profile picture of the user of the corresponding mobile terminal from the preset file server according to the obtained URL positioning information, and updating the profile picture to the local address book.

Step S500, by the second mobile terminal, receiving the IMS call request, and by the first mobile and the second mobile terminal, respectively displaying the latest profile picture of an opposite user on a respective call interface.

An embodiment of the present disclosure further provides a storage device, wherein the storage device stores computer instruction, and the computer instruction enables a computer to execute the methods provided by the above embodiments.

In conclusion, the present disclosure provides a profile picture display method based on IMS calls, a storage device, and a mobile terminal. The method comprises: by a first mobile terminal, sending an IMS call connection request to a second mobile terminal; and by the first mobile terminal and the second mobile terminal, respectively sending a first updating message and a second updating message containing the latest profile picture information of a respective user to each other; by the first mobile terminal and the second mobile terminal, respectively obtaining an MD5 value and URL positioning information of the latest profile picture of an opposite user from the second updating message and the first updating message; by the first mobile terminal and the second mobile terminal, respectively reading profile picture information of a contact in a respective local address book; when profile picture information of an opposite user in a local address book is vacant, downloading a latest profile picture of a user of a corresponding mobile terminal from a preset file server according to the obtained URL positioning information, and storing the profile picture to the local address book; when profile picture information of a user of an opposite mobile terminal exists in a local address book, comparing an MD5 value of an obtained latest profile picture with an MD5 value of a corresponding profile picture in the local address book; when the MD5 values are different, downloading the latest profile picture of the user of the corresponding mobile terminal from the preset file server according to the obtained URL positioning information, and updating the profile picture to the local address book; by the second mobile terminal, receiving the IMS call request, and by the first mobile and the second mobile terminal, respectively displaying the latest profile picture of an opposite user on a respective call interface. By the method of the present disclosure, not only are the address books of the mobile terminals enriched, but also users are enabled to know who the person calling at this time is more intuitively by displaying the profile picture information of the opposite party during the IMS calling process, such that convenience is brought into use of users.

It should be understood that the application of the present disclosure is not limited to the above embodiments. For those skilled in the art, it is possible to make improvements and modifications according to the above description, and all of these improvements and modifications should belong to the protection scope of the appended claims of the present disclosure.

What is claimed is:

1. A storage device storing a plurality of instructions; wherein, the instructions are configured to be loaded and executed by a processor to implement a profile picture display method based on IMS calls comprising the following steps:
setting a file server configured to store the latest profile picture information of a user of the first mobile terminal and of a user of the second mobile terminal in advance;
by the first mobile terminal and the second mobile terminal, regularly uploading the latest profile picture information of a respective user to the file server;
by a first mobile terminal, sending an IMS call connection request to a second mobile terminal, and by the first mobile terminal and the second mobile terminal, respectively sending a first updating message and a second updating message containing the latest profile picture information of a respective user to each other, comprising:
by the first mobile terminal, calling the second mobile terminal and sending an IMS request to the second terminal;
by the first mobile terminal, sending profile picture information newly uploaded to a file server in the form of a first updating message to the second mobile terminal; wherein the first updating message includes profile picture information of a user of the first mobile terminal;
by the second mobile terminal, receiving the first updating message sent from the first mobile terminal;
by the second mobile terminal, sending profile picture information newly uploaded to a file server in the form of a second updating message to the first mobile terminal; wherein the second updating message comprises profile picture information of a user of the second mobile terminal;
by the first mobile terminal and the second mobile terminal, respectively obtaining an MD5 value and URL positioning information of the latest profile picture of the opposite user from the second updating message and the first updating message; comprising:
by the first mobile terminal, obtaining and resolving the second updating message;
by the first mobile terminal, resolving the latest profile picture information of a user of the second mobile terminal from the second updating message, and obtaining an MD5 value and URL positioning information of a profile picture therefrom;
by the second mobile terminal, obtaining and resolving the first updating message;
by the second mobile terminal, resolving the latest profile picture information of a user of the first mobile terminal from the first updating message, and obtaining an MD5 value and URL positioning information of a profile picture therefrom;
by the first mobile terminal and the second mobile terminal, respectively reading profile picture information of a contact in a respective local address book, when profile picture information of an opposite user in a local address book is vacant, downloading the latest profile picture of the user of a corresponding mobile terminal from the preset file server according to the obtained URL positioning information, and storing the profile picture to the local address book;
when profile picture information of a user of the opposite mobile terminal exists in the local address book, comparing an MD5 value of an obtained latest profile picture with an MD5 value of a corresponding profile picture in the local address book; when the MD5 values are different, downloading the latest profile picture of the user of a corresponding mobile terminal from the preset file server according to the obtained URL positioning information, and updating the profile picture to the local address book;
by the second mobile terminal, receiving the IMS call request, and by the first mobile and the second mobile terminal, respectively displaying the latest profile picture of an opposite users on a respective call interface.

2. The storage device according to claim 1, wherein, the profile picture information includes an MD5 value configured to determine whether the profile picture information is updated, and URL positioning information configured to quickly search and accurately download a profile picture from the file server.

3. The storage device according to claim 1, wherein, the by the first mobile terminal and the second mobile terminal, respectively reading profile picture information of a contacts in a respective local address book, when profile picture information of an opposite user in a local address book is vacant, downloading the latest profile picture of the user of a corresponding mobile terminal from the preset file server according to the obtained URL positioning information, and storing the profile picture to the local address book comprises:

by the first mobile terminal and the second mobile terminal, respectively obtaining a respective local address book, and reading profile picture information of all contacts;

when profile picture information of an opposite user in a local address book is vacant, indicating that profile picture information of the user of the corresponding mobile terminal is not stored;

according to obtained URL positioning information of the profile picture of the user of the corresponding mobile terminal, downloading a latest profile picture of the user of the corresponding mobile terminal from the preset file server;

updating the downloaded latest profile picture of the user of the corresponding mobile terminal to the local address book to store.

4. The storage device according to claim 1, wherein, the when profile picture information of a user of the opposite mobile terminal exists in the local address book, comparing an MD5 value of an obtained latest profile picture with an MD5 value of a corresponding profile picture in the local address book; when the MD5 values are different, downloading the latest profile picture of the user of a corresponding mobile terminal from the preset file server according to the obtained URL positioning information, and updating the profile picture to the local address book comprises:

when profile picture information of a user of an opposite mobile terminal exists in a local address book, comparing an MD5 value of an obtained latest profile picture with an MD5 value of a corresponding profile picture in the local address book, and determining whether they are the same;

when the MD5 values are different, downloading the latest profile picture of the user of the corresponding mobile terminal from the preset file server according to the obtained URL positioning information of a profile picture of the user of the corresponding mobile terminal;

replacing an original profile picture in the local address book with the downloaded latest profile picture of the user of the corresponding mobile terminal, and storing.

5. The storage device according to claim 1, wherein, the by the second mobile terminal, receiving the IMS call request, and by the first mobile and the second mobile terminal, respectively displaying the latest profile picture of an opposite users on a respective call interface comprises:

by the second mobile terminal, according to operation instruction of a user, receiving an IMS call request sent from the first mobile terminal;

by the first mobile terminal, displaying an obtained latest profile picture of the user of the second mobile terminal on its call interface;

by the second mobile terminal, displaying an obtained latest profile picture of the user of the first mobile terminal on its call interface.

6. A profile picture display method based on IMS calls, wherein, the method comprises:

setting a file server configured to store the latest profile picture information of a user of the first mobile terminal and of a user of the second mobile terminal in advance;

by the first mobile terminal and the second mobile terminal, regularly uploading the latest profile picture information of a respective user to the file server;

by a first mobile terminal, sending an IMS call connection request to a second mobile terminal, and by the first mobile terminal and the second mobile terminal, respectively sending a first updating message and a second updating message containing the latest profile picture information of a respective user to each other, comprising:

by the first mobile terminal, calling the second mobile terminal and sending an IMS request to the second terminal;

by the first mobile terminal, sending profile picture information newly uploaded to a file server in the form of a first updating message to the second mobile terminal; wherein the first updating message includes profile picture information of a user of the first mobile terminal;

by the second mobile terminal, receiving the first updating message sent from the first mobile terminal;

by the second mobile terminal, sending profile picture information newly uploaded to a file server in the form of a second updating message to the first mobile terminal; wherein the second updating message comprises profile picture information of a user of the second mobile terminal;

by the first mobile terminal and the second mobile terminal, respectively obtaining an MD5 value and URL positioning information of the latest profile picture of the opposite user from the second updating message and the first updating message; by the first mobile terminal and the second mobile terminal, respectively reading profile picture information of a contact in a respective local address book; when profile picture information of an opposite user in a local address book is vacant, downloading the latest profile picture of the user of a corresponding mobile terminal from a preset file server according to the obtained URL positioning information, and storing the profile picture to the local address book;

when profile picture information of a user of the opposite mobile terminal exists in the local address book, comparing an MD5 value of an obtained latest profile picture with an MD5 value of a corresponding profile picture in the local address book; when the MD5 values are different, downloading the latest profile picture of the user of a corresponding mobile terminal from the preset file server according to the obtained URL positioning information, and updating the profile picture to the local address book;

by the second mobile terminal, receiving the IMS call request, and by the first mobile and the second mobile terminal, respectively displaying the latest profile picture of an opposite user on a respective call interface.

7. The profile picture display method based on IMS calls according to claim 6, wherein, the profile picture information includes: an MD5 value configured to determine whether the profile picture information is updated, and URL positioning information configured to quickly search and accurately download a profile picture from the file server.

8. The profile picture display method based on IMS calls according to claim 6, wherein, the by the first mobile terminal and the second mobile terminal, respectively obtaining an MD5 value and URL Positioning information of the latest profile picture of the opposite user from the second updating message and the first updating message comprises:

by the first mobile terminal, obtaining and resolving the second updating message;

by the first mobile terminal, resolving the latest profile picture information of a user of the second mobile terminal from the second updating message, and obtaining an MD5 value and URL positioning information of a profile picture therefrom;
by the second mobile terminal, obtaining and resolving the first updating message;
by the second mobile terminal, resolving the latest profile picture information of a user of the first mobile terminal from the first updating message, and obtaining an MD5 value and URL positioning information of a profile picture therefrom.

9. The profile picture display method based on IMS calls according to claim 6, wherein, the by the first mobile terminal and the second mobile terminal, respectively reading profile picture information of a contact in a respective local address book, when profile picture information of an opposite user in a local address book is vacant, downloading the latest profile picture of the user of a corresponding mobile terminal from the preset file server according to the obtained URL positioning information, and storing the profile picture to the local address book comprises:
by the first mobile terminal and the second mobile terminal, respectively obtaining a respective local address book, and reading profile picture information of all contacts;
when profile picture information of an opposite user in a local address book is vacant, indicating that profile picture information of the user of the corresponding mobile terminal is not stored;
according to obtained URL positioning information of the profile picture of the user of the corresponding mobile terminal, downloading a latest profile picture of the user of the corresponding mobile terminal from the preset file server;
updating the downloaded latest profile picture of the user of the corresponding mobile terminal to the local address book to store.

10. The profile picture display method based on IMS calls according to claim 6, wherein, the when profile picture information of a user of the opposite mobile terminal exists in the local address book, comparing an MD5 value of an obtained latest profile picture with an MD5 value of a corresponding profile picture in the local address book-when the MD5 values are different, downloading the latest profile picture of the user of a corresponding mobile terminal from the preset file server according to the obtained URL positioning information, and updating the profile picture to the local address book comprises:
when profile picture information of a user of an opposite mobile terminal exists in a local address book, comparing an MD5 value of an obtained latest profile picture with an MD5 value of a corresponding profile picture in the local address book, and determining whether they are the same;
when the MD5 values are different, downloading the latest profile picture of the user of the corresponding mobile terminal from the preset file server according to the obtained URL positioning information of a profile picture of the user of the corresponding mobile terminal;
replacing an original profile picture in the local address book with the downloaded latest profile picture of the user of the corresponding mobile terminal, and storing.

11. The profile picture display method based on IMS calls according to claim 6, wherein, the by the second mobile terminal, receiving the IMS call request, and by the first mobile and the second mobile terminal, respectively displaying the latest profile picture of an opposite user on a respective call interfaces comprises:
by the second mobile terminal, according to operation instruction of a user, receiving an IMS call request sent from the first mobile terminal;
by the first mobile terminal, displaying an obtained latest profile picture of the user of the second mobile terminal on its call interface;
by the second mobile terminal, displaying an obtained latest profile picture of the user of the first mobile terminal on its call interface.

12. A mobile terminal, comprising: a processor, and a storage device in communication connection with the processor; wherein, the storage device is configured for storing a plurality of instructions; the processor is configured for calling the instructions in the storage device to execute a method for implementing profile picture display based on IMS calls comprising:
setting a file server configured to store the latest profile picture information of a user of the first mobile terminal and of a user of the second mobile terminal in advance;
by the first mobile terminal and the second mobile terminal, regularly uploading the latest profile picture information of a respective user to the file server;
by a first mobile terminal, sending an IMS call connection request to a second mobile terminal, and by the first mobile terminal and the second mobile terminal, respectively sending a first updating message and a second updating message containing the latest profile picture information of a respective user to each other, comprising:
by the first mobile terminal, calling the second mobile terminal and sending an IMS request to the second terminal;
by the first mobile terminal, sending profile picture information newly uploaded to a file server in the form of a first updating message to the second mobile terminal; wherein the first updating message includes profile picture information of a user of the first mobile terminal;
by the second mobile terminal, receiving the first updating message sent from the first mobile terminal;
by the second mobile terminal, sending profile picture information newly uploaded to a file server in the form of a second updating message to the first mobile terminal; wherein the second updating message comprises profile picture information of a user of the second mobile terminal;
by the first mobile terminal and the second mobile terminal, respectively obtaining an MD5 value and URL positioning information of the latest profile picture of the opposite user from the second updating message and the first updating message;
by the first mobile terminal and the second mobile terminal, respectively reading profile picture information of a contacts in a respective local address book, when profile picture information of an opposite user in a local address book is vacant, downloading the latest profile picture of the user of a corresponding mobile terminal from a preset file server according to the obtained URL positioning information, and storing the profile picture to the local address book;
when profile picture information of a user of the opposite mobile terminal exists in the local address book, comparing an MD5 value of an obtained latest profile picture with an MD5 value of a corresponding profile picture in the local address book; when the MD5 values are different, downloading the latest profile picture of the user of a corresponding mobile terminal from the preset file server according to the obtained URL positioning information, and updating the profile picture to the local address book;

by the second mobile terminal, receiving the IMS call request, and by the first mobile and the second mobile terminal, respectively displaying the latest profile picture of an opposite user on a respective call interface; wherein the method further comprises: taking a mobile terminal actively calling and sending an IMS call connection request as the first mobile terminal; taking a mobile terminal being called and receiving an IMS call connection request as the second mobile terminal.

13. The mobile terminal according to claim 12, wherein, the profile picture information includes: an MD5 value configured to determine whether the profile picture information is updated, and URL positioning information configured to quickly search and accurately download a profile picture from the file server.

14. The mobile terminal according to claim 12, wherein, the by the first mobile terminal and the second mobile terminal, respectively obtaining an MD5 value and URL positioning information of the latest profile picture of the opposite user from the second updating message and the first updating message comprises:
   by the first mobile terminal, obtaining and resolving the second updating message;
   by the first mobile terminal, resolving the latest profile picture information of a user of the second mobile terminal from the second updating message, and obtaining an MD5 value and URL positioning information of a profile picture therefrom;
   by the second mobile terminal, obtaining and resolving the first updating message;
   by the second mobile terminal, resolving the latest profile picture information of a user of the first mobile terminal from the first updating message, and obtaining an MD5 value and URL positioning information of a profile picture therefrom.

15. The mobile terminal according to claim 12, wherein, the by the first mobile terminal and the second mobile terminal, respectively reading profile picture information of a contact in a respective local address book, when profile picture information of an opposite user in a local address book is vacant, downloading the latest profile picture of the user of a corresponding mobile terminal from a preset file server according to the obtained URL positioning information, and storing the profile picture to the local address book comprises:
   by the first mobile terminal and the second mobile terminal, respectively obtaining a respective local address book, and reading profile picture information of all contacts;
   when profile picture information of an opposite user in a local address book is vacant, indicating that profile picture information of the user of the corresponding mobile terminal is not stored;
   according to obtained URL positioning information of the profile picture of the user of the corresponding mobile terminal, downloading a latest profile picture of the user of the corresponding mobile terminal from the preset file server;
   updating the downloaded latest profile picture of the user of the corresponding mobile terminal to the local address book to store.

* * * * *